(12) United States Patent
Dai et al.

(10) Patent No.: US 12,333,089 B2
(45) Date of Patent: Jun. 17, 2025

(54) METHOD FOR MANAGING SENSOR DATA, HOST, AND COMPUTER READABLE STORAGE MEDIUM

(71) Applicant: HTC Corporation, Taoyuan (TW)

(72) Inventors: Chen-Si Dai, Taoyuan (TW); Ya Lun Tsai, Taoyuan (TW)

(73) Assignee: HTC Corporation, Taoyuan (TW)

( * ) Notice: Subject to any disclaimer, the term of this patent is extended or adjusted under 35 U.S.C. 154(b) by 49 days.

(21) Appl. No.: 18/519,090

(22) Filed: Nov. 27, 2023

(65) Prior Publication Data

US 2025/0173004 A1 May 29, 2025

(51) Int. Cl.
*G06F 3/0346* (2013.01)
*G06F 3/01* (2006.01)
*G06T 7/194* (2017.01)

(52) U.S. Cl.
CPC ............ *G06F 3/0346* (2013.01); *G06F 3/011* (2013.01); *G06T 7/194* (2017.01)

(58) Field of Classification Search
None
See application file for complete search history.

(56) References Cited

U.S. PATENT DOCUMENTS

| | | | |
|---|---|---|---|
| 9,767,570 B2 * | 9/2017 | Li | G06V 20/54 |
| 9,940,729 B1 * | 4/2018 | Kwant | G06V 20/56 |
| 2020/0342597 A1 * | 10/2020 | Chukka | G06T 7/194 |
| 2021/0228978 A1 * | 7/2021 | Nietfeld | G06F 3/0346 |
| 2022/0270289 A1 * | 8/2022 | Zhang | G06T 7/194 |
| 2022/0413434 A1 * | 12/2022 | Parra Pozo | H04M 3/568 |
| 2024/0221182 A1 * | 7/2024 | Mambelli | G06Q 20/20 |
| 2025/0054164 A1 * | 2/2025 | Singh | G06T 7/194 |

FOREIGN PATENT DOCUMENTS

EP 3435284 1/2019

OTHER PUBLICATIONS

"Search Report of European Counterpart Application", issued on Oct. 15, 2024 , p. 1-p. 5.

* cited by examiner

Primary Examiner — Matthew Yeung
(74) Attorney, Agent, or Firm — JCIPRNET

(57) ABSTRACT

The embodiments of the disclosure provide a method for managing sensor data, a host, and a computer readable storage circuit. The method includes: obtaining a plurality of first screen frames of a first application and obtaining a first sensor data associated with first screen frames from a first sensor; determining a first foreground part within each of first screen frames; determining a first mask associated with the first sensor based on the first foreground part within each of first screen frames and the first sensor data associated with first screen frames; obtaining a plurality of second screen frames of the first application and obtaining a second sensor data associated with second screen frames from the first sensor; managing the second sensor data associated with second screen frames by using the first mask; and interacting with the first application with the managed second sensor data.

16 Claims, 4 Drawing Sheets

METHOD FOR MANAGING SENSOR DATA, HOST, AND COMPUTER READABLE STORAGE MEDIUM

BACKGROUND

1. Field of the Invention

The present disclosure generally relates to a mechanism for managing sensor data, in particular, to a method for managing sensor data, a host, and a computer readable storage medium.

2. Description of Related Art

In the technology of virtual reality (VR), users can interact with the VR applications with devices such as handheld controllers and/or wearable devices (e.g., smart rings, smart bracelet, etc.). In this case, the VR system may measure the sensor data provided by the devices and accordingly control/interact with the VR application.

However, due to problems such as a noisy environment and/or occlusion, the sensor data may be unreliable and/or undetectable, such that the user may not properly control/interact with the VR application.

SUMMARY OF THE INVENTION

Accordingly, the disclosure is directed to a method for managing sensor data, a host, and a computer readable storage medium, which may be used to solve the above technical problems.

The embodiments of the disclosure provide a method for managing sensor data, applied to a host, including: obtaining, by the host, a plurality of first screen frames of a first application and obtaining a first sensor data associated with the plurality of first screen frames from a first sensor, wherein the first sensor data associated with the plurality of first screen frames are detected during the plurality of first screen frames are displayed; determining, by the host, a first foreground part within each of the plurality of first screen frames; determining, by the host, a first mask associated with the first sensor based on the first foreground part within each of the plurality of first screen frames and the first sensor data associated with the plurality of first screen frames; obtaining, by the host, a plurality of second screen frames of the first application and obtaining a second sensor data associated with the plurality of second screen frames from the first sensor; managing, by the host, the second sensor data associated with the plurality of second screen frames by using the first mask; and interacting, by the host, with the first application with the managed second sensor data.

The embodiments of the disclosure provide a host including a storage circuit and a processor. The storage circuit stores a program code. The processor is coupled to the non-transitory storage circuit and accesses the program code to perform: obtaining a plurality of first screen frames of a first application and obtaining a first sensor data associated with the plurality of first screen frames from a first sensor, wherein the first sensor data associated with the plurality of first screen frames are detected during the plurality of first screen frames are displayed; determining a first foreground part within each of the plurality of first screen frames; determining a first mask associated with the first sensor based on the first foreground part within each of the plurality of first screen frames and the first sensor data associated with the plurality of first screen frames; obtaining a plurality of second screen frames of the first application and obtaining a second sensor data associated with the plurality of second screen frames from the first sensor; managing the second sensor data associated with the plurality of second screen frames by using the first mask; and interacting with the first application with the managed second sensor data.

The embodiments of the disclosure provide a computer readable storage medium, the computer readable storage medium recording an executable computer program, the executable computer program being loaded by a host to perform steps of: obtaining a plurality of first screen frames of a first application and obtaining a first sensor data associated with the plurality of first screen frames from a first sensor, wherein the first sensor data associated with the plurality of first screen frames are detected during the plurality of first screen frames are displayed; determining a first foreground part within each of the plurality of first screen frames; determining a first mask associated with the first sensor based on the first foreground part within each of the plurality of first screen frames and the first sensor data associated with the plurality of first screen frames; obtaining a plurality of second screen frames of the first application and obtaining a second sensor data associated with the plurality of second screen frames from the first sensor; managing the second sensor data associated with the plurality of second screen frames by using the first mask; and interacting with the first application with the managed second sensor data.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
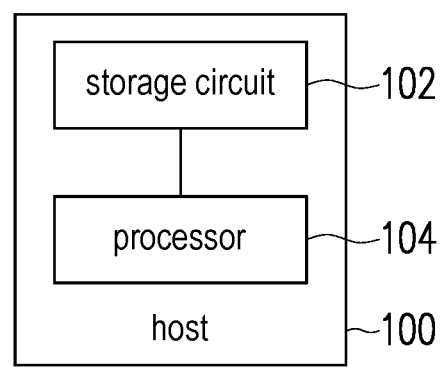
FIG. 1 shows a schematic diagram of a host according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a schematic diagram of a host according to an embodiment of the disclosure. In various embodiments, the host 100 can be any smart device and/or computer device that can provide visual contents of reality services such as virtual reality (VR) service, augmented reality (AR) services, mixed reality (MR) services, and/or extended reality (XR) services, but the disclosure is not limited thereto. In some embodiments, the host 100 can be a head-mounted display (HMD) capable of showing/providing visual contents (e.g., AR/VR contents) for the wearer/user to see. For better understanding the concept of the disclosure, the host 100 would be assumed to be an VR device (e.g., a VR HMD) for providing VR contents for the user to see, but the disclosure is not limited thereto.

In one embodiment, the host 100 can be disposed with built-in displays for showing the VR contents for the user to see. Additionally or alternatively, the host 100 may be connected with one or more external displays, and the host 100 may transmit the VR contents to the external display(s) for the external display(s) to display the VR contents, but the disclosure is not limited thereto.

In FIG. 1, the host 100 includes a storage circuit 102 and a processor 104. The storage circuit 102 is one or a combination of a stationary or mobile random access memory (RAM), read-only memory (ROM), flash memory, hard disk, or any other similar device, and which records a plurality of modules and/or a program code that can be executed by the processor 104.

The processor 104 may be coupled with the storage circuit 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 104 may access the modules and/or the program code stored in the storage circuit 102 to implement the method for managing sensor data provided in the disclosure, which would be further discussed in the following.

Figure 2:
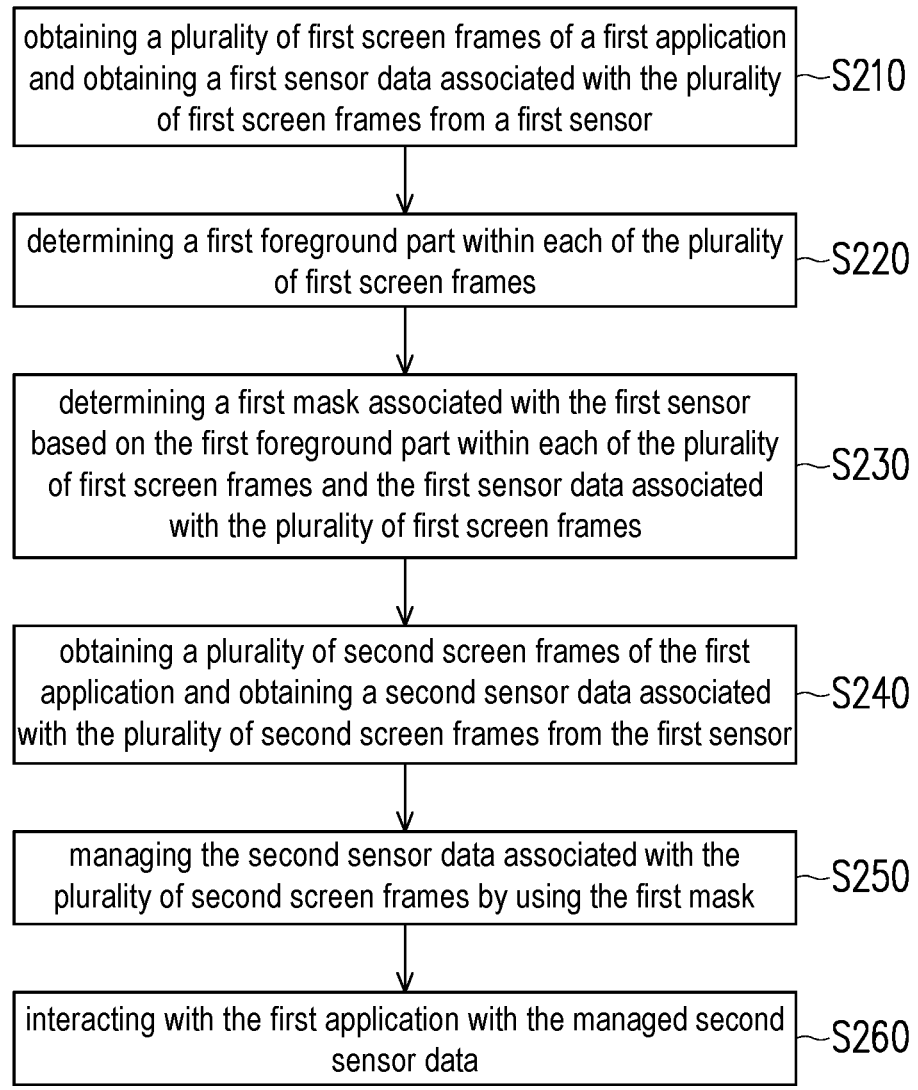
FIG. 2 shows a flow chart of the method for managing sensor data according to an embodiment of the disclosure.

See FIG. 2, which shows a flow chart of the method for managing sensor data according to an embodiment of the disclosure. The method of this embodiment may be executed by the host 100 in FIG. 1, and the details of each step in FIG. 2 will be described below with the components shown in FIG. 1.

In step S210, the processor 104 obtains a plurality of first screen frames of a first application and obtains a first sensor data associated with the plurality of first screen frames from a first sensor.

In various embodiments of the disclosure, the first sensor can include one or more sensors disposed on devices such as the handheld controllers and/or wearable devices connected with the host 100 (e.g., smart rings, smart wrist/ankle bands, etc.).

In some embodiments, the one or more sensor may include, for example, inertial measurement units (IMU), optical finger navigation (OFN), accelerometer, gyro sensors, etc., and the corresponding first sensor data may be, for example, 6 degree-of-freedom (6DOF) or the like. In some embodiments, the first sensor can be environment sensors (e.g., tracking cameras or the like) applying technology such as Simultaneous localization and mapping (SLAM), and the corresponding first sensor data may be, for example, coordinates/poses of the devices used for interacting with the first application.

In some embodiments, the first application may be a VR application (e.g., a game application) or the like.

In the embodiment where the host 100 is the HMD, the first screen frames may include the screen frames displayed on the near-eye display of the HMD for the user to see. In another embodiment where the host 100 is, for example, a 2D game console, and connected with one or more external displays, the first screen frames may include the screen frames provided by the host 100 to the external display(s) to show for the user to see, but the disclosure is not limited thereto.

In the embodiments of the disclosure, the first sensor data associated with the plurality of first screen frames are detected during the plurality of first screen frames are displayed.

For example, if the first screen frames are shown within a duration from a time point t1 to a time point t2, the associated first sensor data may be the sensor data measured by the first sensor within the duration from the time point t1 to the time point t2.

In one embodiment, the first sensor data may include data segments respectively corresponding to the time points in the duration from the time point t1 to the time point t2.

For better understanding the concept of the disclosure, the first sensor data would be assumed to be measured within the duration from the time point t1 to the time point t2, but the disclosure is not limited thereto.

In step S220, the processor 104 determines a first foreground part within each of the plurality of first screen frames.

In various embodiments, the processor 104 may use any existing technology/algorithms to extract the first foreground part from each of the plurality of first screen frames.

In some embodiments, the first foreground part within each of the plurality of first screen frames may be regarded as the part (e.g., a user representative object) corresponding to the user within each of the plurality of first screen frames.

For example, if the first application is a racing game, each of the first screen frames may include a background part showing the racing field and the track therein and a foreground part showing the car controlled by the user. In this case, the first foreground part within each of the plurality of first screen frames may be image regions corresponding to the car controlled by the user, but the disclosure is not limited thereto.

In another embodiment, if the first application is the racing game, the foreground part may include the user representative object (e.g., the car), the racing field, the track, and the background may include other parts other than the foreground part. In this case, the first foreground part within each of the plurality of first screen frames may be image regions corresponding to the car, the racing field, and the track, but the disclosure is not limited thereto.

In step S230, the processor 104 determines a first mask associated with the first sensor based on the first foreground part within each of the plurality of first screen frames and the first sensor data associated with the plurality of first screen frames.

In one embodiment, the processor 104 may characterize the first sensor data by using a statistical model. For example, the processor 104 may use a statistical model (e.g., a Gaussian Mixture Model (GMM)) to characterize the first sensor data.

In one embodiment, the first sensor data may be characterized by, for example, 3-axis coordinates data, and the distributions of the data components on the 3-axis (e.g., X, Y, Z-axis) can be characterized by the GMM, but the disclosure is not limited thereto.

In one embodiment, since the first foreground part corresponding to each first screen frame would be configured with a default moving range, the processor 104 can determine a first numerical range based on the statistical model and a default moving range of the first foreground part within each of the plurality of first screen frames.

For example, if the first foreground part corresponds to, for example, a virtual car in the first application, the virtual car may only be allowed to move within a corresponding default moving range, such as the track. In this case, the first sensor data that intends to move the virtual car to any place out of the track may be regarded as invalid/meaningless/unreliable.

Since the virtual car would be typically horizontally moved in the first application, the variation of the data component on the X-axis of the first sensor data would be larger than the variation of the data component on the Y/Z-axis of the first sensor data.

In one embodiment, when the virtual car has been moved to a first boundary (e.g., left boundary) of the track, the processor 104 may determine the X-component of the corresponding first sensor data as a first limit (e.g., a lower limit). Likewise, when the virtual car has been moved to a second boundary (e.g., right boundary) of the track, the processor 104 may determine the X-component of the corresponding first sensor data as a second limit (e.g., an upper limit). In this case, the X component data not within the numerical range between the first limit and the second limit would be regarded as invalid/meaningless/unreliable.

Therefore, the processor 104 may determine the numerical range between the first limit and the second limit as the first numerical range, but the disclosure is not limited thereto.

In one embodiment, the processor 104 may determine the first numerical range as the first mask. In some embodiments, the sensor data provided by the first sensor may be unreliable due to, for example, environmental noise and/or interference. In this case, the processor 104 may use the first mask to determine whether the sensor data is valid/reliable and accordingly filter the sensor data provided by the first sensor.

Specifically, in step S240, the processor 104 obtains a plurality of second screen frames of the first application and obtain a second sensor data associated with the plurality of second screen frames from the first sensor.

In the embodiment where the host 100 is the HMD, the second screen frames may include the screen frames displayed on the near-eye display of the HMD for the user to see. In another embodiment where the host 100 is connected with one or more external displays, the second screen frames may include the screen frames provided by the host 100 to the external display(s) to show for the user to see, but the disclosure is not limited thereto. In the embodiments of the disclosure, the second sensor data associated with the plurality of second screen frames are detected during the plurality of second screen frames are displayed.

For example, if the second screen frames are shown within a duration from a time point t3 to a time point t4, the associated second sensor data may be the sensor data measured by the first sensor within the duration from the time point t3 to the time point t4.

In one embodiment, the second sensor data may include data segments respectively corresponding to the time points in the duration from the time point t3 to the time point t4.

As mentioned in the above, the second sensor data may be unreliable due to noise and/or interferences. Therefore, in step S250, the processor 104 filters the second sensor data associated with the plurality of second screen frames by using the first mask (e.g., the first numerical range).

In one embodiment, the processor 104 may determine whether the second sensor data includes outlier data not within the first numerical range. In response to determining that the second sensor data includes the outlier data not within the first numerical range, filtering out the outlier data from the second sensor data. Accordingly, the unreliable part (e.g., the outlier data) of the second sensor data would be filtered out.

In step S260, the processor 104 interacts with the first application with the managed second sensor data. Since the unreliable part of the second sensor data has been filtered out, the processor 104 can better control/interact with the first application, such that the user experience would not be affected by the noisy/interferential environment.

In some embodiments, the processor 104 can determine different masks for different application scenes and use the corresponding mask to filter the sensor data of the corresponding application scene.

For example, in one embodiment, the processor 104 may determine whether a first application scene corresponds to a second application scene before performing step S250, wherein the first application scene corresponds to the plurality of first screen frames, and the second application scene corresponds to the plurality of second screen frames.

In one embodiment, in response to determining that the first application scene corresponds to the second application scene, the processor 104 may perform step S250 to filter the second sensor data associated with the plurality of second screen frames by using the first mask. On the other hand, in response to determining that the first application scene does not correspond to the second application scene, the processor 104 may filter the second sensor data associated with the plurality of second screen frames by using a second mask corresponding to the second application scene.

For example, if both of the first application scene and the second application scene are determined to be a car racing field, the processor 104 may determine that the first application scene corresponds to the second application scene and use the first mask to filter the second sensor data.

However, if the first application scene and the second application scene are respectively determined to be a car racing field and a plane racing field, the processor 104 may determine that the first application scene does not correspond to the second application scene and do not use the first mask to filter the second sensor data. Instead, the processor 104 may obtain the second mask corresponding to the second application scene and use the second mask to filter the second sensor data.

In the embodiments of the disclosure, the second mask may be determined by following a similar procedure described in steps S210 to S230, which would not be repeated herein.

In some embodiments, the first mask may be dedicated to the first application and only be used to filter the sensor data provided by the first sensor. That is, the first mask would not be applied to other applications and/or the sensor data provided by other sensors.

In one embodiment, the processor 104 may only perform step S250 and S260 when the signal quality is unsatisfied due to noise and/or interference.

Specifically, before step S250, the processor 104 may further determine whether a signal quality of the second sensor data satisfies a predetermined condition. In some embodiments, the signal quality of the second sensor data may be characterized by, for example, the signal-to-noise ratio (SNR), the signal-to-noise-and-interference ratio (SINR) of the second sensor data, but the disclosure is not limited thereto.

In one embodiment, in response to determining that the signal quality of the second sensor data does not satisfy the predetermined condition, the processor 104 may perform step S250 to filter the second sensor data associated with the plurality of second screen frames by using the first mask. For example, if the processor 104 determines that the SINR of the second sensor data is less than a predetermined threshold, the processor 104 may determine that the signal quality of the second sensor data does not satisfy the predetermined condition and accordingly perform step S250.

In another embodiment, in response to determining that the signal quality of the second sensor data does not satisfy the predetermined condition, the processor 104 may maintain the second sensor data associated with the plurality of second screen frames and interact with the first application with the maintained second sensor data.

For example, if the processor 104 determines that the SINR of the second sensor data is not less than a predetermined threshold, the processor 104 may maintain the second sensor data associated with the plurality of second screen frames and interact with the first application with the maintained second sensor data, but the disclosure is not limited thereto.

In some embodiments, some of the second sensor data may be lost/undetectable due to, for example, occlusion, and the embodiments of the disclosure have provided a solution for handling this problem. Details would be discussed with FIG. 3.

Figure 3:
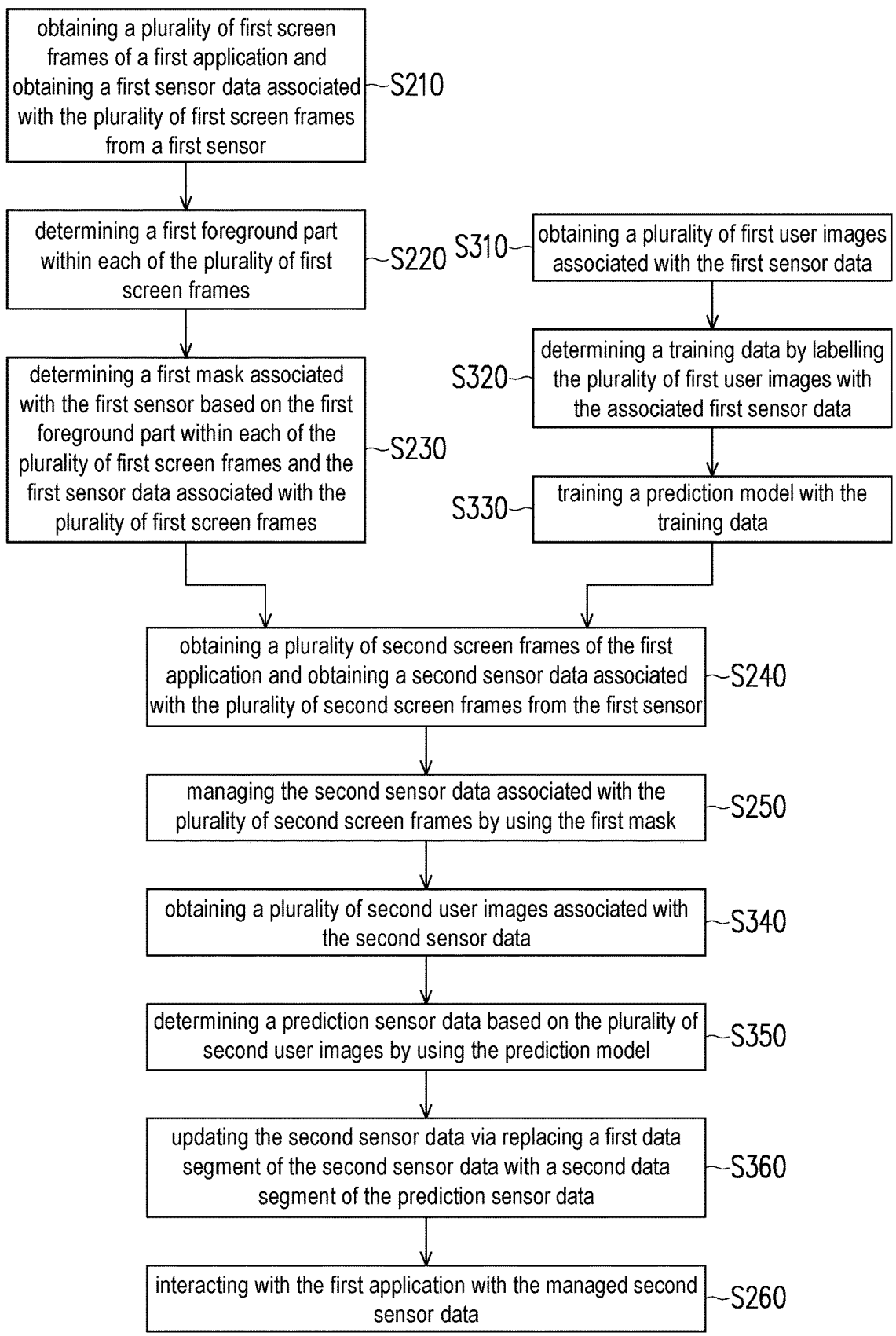
FIG. 3 shows another flow chart of the method for managing sensor data according to FIG. 2.

See FIG. 3, which shows another flow chart of the method for managing sensor data according to FIG. 2. In the embodiment, the processor 104 may further perform steps S310 to S330 before step S240.

In step S310, the processor 104 obtains a plurality of first user images associated with the first sensor data, wherein the plurality of first user images are captured during the first sensor data is detected.

In the embodiment where the first sensor data is assumed to be detected in the duration from the time point t1 to the time point t2, the first user images may be the user images captured in the duration from the time point t1 to the time point t2, but the disclosure is not limited thereto.

In the embodiments of the disclosure, one or more external cameras may be disposed at the environment where the user experiences the reality service (e.g., the VR service) of the host 100, and the external camera(s) may take images of the user experiencing the reality service (e.g., the VR service) as the user images. In some embodiments, the user images can be tracking images of the user's body, but the disclosure is not limited thereto.

Next, in step S320, the processor 104 determines a training data by labelling the plurality of first user images with the associated first sensor data and train a prediction model with the training data in step S330. In various embodiments, the prediction model can be a neural network (e.g., a convolutional neural network (CNN), a recurrent neural network (RNN), etc.) or any other machine learning model, but the disclosure is not limited thereto.

In the embodiments of the disclosure, the prediction model can learn the correspondence between the user images and the sensor data during the training procedure. That is, the prediction model can learn what the sensor data would be when the user in the user image is presenting a particular posture. In this case, when the trained prediction model receives another user image, the trained prediction model may generate/output/predict the corresponding sensor data, but the disclosure is not limited thereto.

Next, the processor 104 may perform steps S240 and S250, and then perform steps S340 to S360. In another embodiment, the processor 104 can also firstly perform steps S340 to S360, and then perform steps S240 and S250. In some embodiments, the processor 104 may performs steps S240, S250, S340 to S360 in any order based on the requirements of the designer, and some of the steps may be even performed at the same time, but the disclosure is not limited thereto.

In step S340, the processor 104 obtaining a plurality of second user images associated with the second sensor data.

In the embodiment where the second sensor data is assumed to be detected in the duration from the time point t3 to the time point t4, the second user images may be the user images captured by the external camera(s) in the duration from the time point t3 to the time point t4, but the disclosure is not limited thereto.

In step S350, the processor 104 determines a prediction sensor data based on the plurality of second user images by using the prediction model. In the embodiments of the disclosure, the processor 104 may input each of the second user images into the predication model, and the predication model may output/generate/predict the prediction sensor data corresponding to the second user images.

In the embodiments where the second user images are assumed to be captured in the duration from the time point t3 to the time point t4, the prediction model may output the prediction sensor data corresponding to the duration from the time point t3 to the time point t4.

In one embodiment, the prediction sensor data may include data segments respectively corresponding to the time points in the duration from the time point t3 to the time point t4.

In step S360, the processor 104 updates the second sensor data via replacing a first data segment of the second sensor data with a second data segment of the prediction sensor data. In some embodiments, the processor 104 can be regarded as updating the second sensor data via filling/supplying the first data segment of the second sensor data with the second data segment of the prediction sensor data. In some embodiments, step S360 can be performed when the second sensor data is determined to be abnormal/missing, but the disclosure is not limited thereto. For better understanding the concept of step S360, FIG. 4 would be used as an illustrative example.

Figure 4:
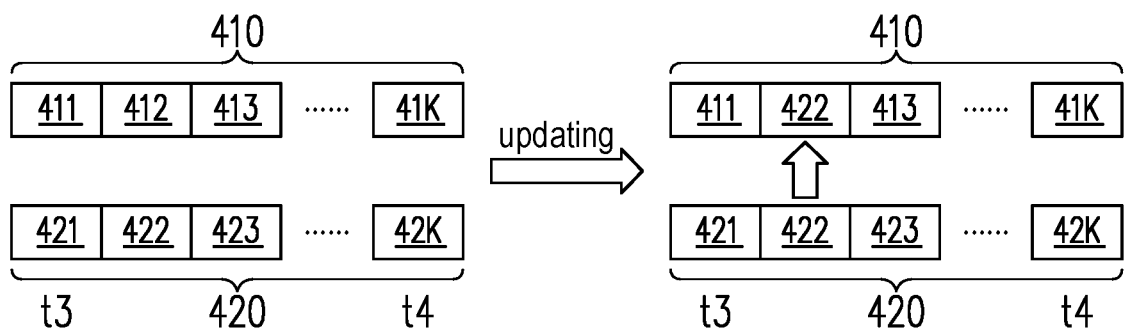
FIG. 4 shows a schematic diagram of updating the second sensor data according to an embodiment of the disclosure.

See FIG. 4, which shows a schematic diagram of updating the second sensor data according to an embodiment of the disclosure.

In FIG. 4, it is assumed that the second sensor data 410 are measured in the duration from the time point t3 to the time point t4 and includes data segments 411 to 41K, wherein the data segments 411 to 41K respectively corresponding to the K (e.g., K is an integer) time points in the duration from the time point t3 to the time point t4.

In the embodiment, when the processor 104 obtains the second user images respectively corresponding to the K time points, the processor 104 may input each second user image to the trained prediction model, and the prediction model may output the prediction sensor data 420 in response to the second user images.

In FIG. 4, the prediction sensor data 420 includes data segments 421 to 42K, wherein the data segments 421 to 42K respectively corresponding to the K time points in the duration from the time point t3 to the time point t4. From another perspective, the data segments 421 to 42K in the prediction sensor data 420 respectively corresponds to the data segments 411 to 41K in the second sensor data 410.

In the embodiments of the disclosure, when the processor 104 intends to update the second sensor data 410, the processor 104 may replace a first data segment among the data segments 411 to 41K with a corresponding second data segment among the data segments 421 to 42K.

For example, if the processor 104 determines that the data segment 411 in the second sensor data 410 needs to be replaced, the processor 104 may replace the data segment 411 with the corresponding data segment 421 in the prediction sensor data 420. For another example, if the processor 104 determines that the data segment 41K in the second sensor data 410 needs to be replaced, the processor 104 may replace the data segment 41K with the corresponding data segment 42K in the prediction sensor data 420.

In one embodiment, the first data segment in the second sensor data 410 may be the data segment determined to be lost/missing/abnormal. For example, if the processor 104 determines that the data segment 412 in the second sensor data 410 has been lost/missing/abnormal, the processor 104 may determine that the data segment 412 needs to be replaced/filled/supplied, and use the data segment 422 in the prediction sensor data 420 to replace/fill/supply the data segment 412, as shown in FIG. 4. In this case, the updated second sensor data 410 includes data segments 411, 422, 413 to 41K.

Next, the processor 104 may perform step S260 with the updated second sensor data 420. In one embodiment, since the processor 104 has performed steps S240 and S250 before step S260, some of the data segments in the second sensor data 410 may be already filtered out. In this case, the processor 104 may perform step S260 with the updated and/or managed second sensor data 410.

For example, if the data segment 411 in the second sensor data 410 has been filtered out in step S250, the resulted second sensor data 410 in FIG. 4 may include data segments 422, 413 to 41K, but the disclosure is not limited thereto.

In some embodiments, the processor 104 may only perform step S360 when the data loss rate is too high.

For example, before performing step S360, the processor 104 may determine whether the data loss rate of the first application is higher than a loss rate threshold.

In one embodiment, in response to determining that the data loss rate of the first application is higher than the loss rate threshold, the processor 104 may perform step S350 to update the second sensor data via replacing the first data segment of the second sensor data with the second data segment of the prediction sensor data.

On the other hand, in response to determining that the data loss rate of the first application is not higher than the loss rate threshold, it represents that the lost data segment(s) in the second sensor data may not affect the interaction with the first application. Therefore, the processor 104 may maintain the second sensor data. That is, the processor 104 may let the lost data segment(s) in the second sensor data remain lost when the data loss rate is acceptable, but the disclosure is not limited thereto.

In one embodiment, the method in FIG. 2 can be regarded as including a development phase and a runtime phase, wherein the development phase includes steps S210 to S230, and the runtime phase includes steps S240 to S260. The development phase can be performed prior to the scenario where the user actually experiences the first application, and the runtime phase can correspond to the scenario where the user actually experiences the first application.

In another embodiment, method in FIG. 2 can be regarded as including a first runtime phase and a second runtime phase, wherein the first runtime phase includes steps S210 to S230, and the second runtime phase includes steps S240 to S260. The first runtime phase can be the scenario where the user previously experiences the first application, and the second runtime phase can be the scenario where the user currently experiences the first application, but the disclosure is not limited thereto.

In some embodiments, the step S250 in FIG. 2 can be understood as corresponding to a first procedure. In FIG. 3, a second procedure involving steps S310 to S360 can be combined into the flow of FIG. 2. That is, the flow in FIG. 3 can be regarded as involving the first procedure and the second procedure. In another embodiment, FIG. 3 can be modified to be merely involving the second procedure via removing step S250 from FIG. 3, but the disclosure is not limited thereto.

The disclosure further provides a computer readable storage medium for executing the method for managing sensor data. The computer readable storage medium is composed of a plurality of program instructions (for example, a setting program instruction and a deployment program instruction) embodied therein. These program instructions can be loaded into the host 100 and executed by the same to execute the method for managing sensor data and the functions of the host 100 described above.

In summary, the embodiments of the disclosure provide a solution to determine a first mask based on the first foreground in each first screen frame and the corresponding first sensor data, and use the first mask to filter out, for example, outlier data in the second sensor data. In this case, the second sensor data may be less affected by the noise and/or interference in the environment.

In addition, the embodiments of the disclosure can further train a prediction model for determining the corresponding prediction sensor data based on the user images. In this case, when one or more data segments of the second sensor data is determined to be lost, the corresponding data segments in the prediction sensor data can be used to replace/fill/supply the lost data segment(s). Accordingly, the second sensor data may be less affected by, for example, the problem of occlusion.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for managing sensor data, applied to a host, comprising:

obtaining, by the host, a plurality of first screen frames of a first application and obtaining a first sensor data associated with the plurality of first screen frames from a first sensor, wherein the first sensor data associated with the plurality of first screen frames are detected during the plurality of first screen frames are displayed;

determining, by the host, a first foreground part within each of the plurality of first screen frames;

determining, by the host, a first mask associated with the first sensor based on the first foreground part within each of the plurality of first screen frames and the first sensor data associated with the plurality of first screen frames;

obtaining, by the host, a plurality of second screen frames of the first application and obtaining a second sensor data associated with the plurality of second screen frames from the first sensor;

managing, by the host, the second sensor data via performing at least one of a first procedure and a second procedure, wherein the first procedure comprises managing, by the host, the second sensor data associated with the plurality of second screen frames by using the first mask, and the second procedure comprises:
  obtaining a plurality of first user images associated with the first sensor data, wherein the plurality of first user images are captured during the first sensor data is detected;
  determining a training data by labelling the plurality of first user images with the associated first sensor data;
  training a prediction model with the training data;
  obtaining a plurality of second user images associated with the second sensor data;
  determining a prediction sensor data based on the plurality of second user images by using the prediction model;
  updating the second sensor data via replacing a first data segment of the second sensor data with a second data segment of the prediction sensor data, wherein the second data segment corresponds to the first data segment; and
interacting, by the host, with the first application with the managed second sensor data.

2. The method according to claim 1, wherein the first mask is characterized by a first numerical range, and the step of managing the second sensor data associated with the plurality of second screen frames by using the first mask comprises:
  in response to determining that the second sensor data comprises outlier data not within the first numerical range, filtering out the outlier data from the second sensor data.

3. The method according to claim 1, wherein before the step of managing the second sensor data associated with the plurality of second screen frames by using the first mask, the method further comprises:
  determining whether a first application scene corresponds to a second application scene, wherein the first application scene corresponds to the plurality of first screen frames, and the second application scene corresponds to the plurality of second screen frames; and
  in response to determining that the first application scene corresponds to the second application scene, filtering the second sensor data associated with the plurality of second screen frames by using the first mask.

4. The method according to claim 3, further comprising:
  in response to determining that the first application scene does not correspond to the second application scene, filtering the second sensor data associated with the plurality of second screen frames by using a second mask corresponding to the second application scene.

5. The method according to claim 1, wherein the step of determining the first mask associated with the first sensor based on the first foreground part within each of the plurality of first screen frames and the first sensor data associated with the plurality of first screen frames comprises:
  characterizing the first sensor data by using a statistical model;
  determining a first numerical range based on the statistical model and a default moving range of the first foreground part within each of the plurality of first screen frames; and
  determining the first numerical range as the first mask.

6. The method according to claim 1, wherein before the step of updating the second sensor data, the method further comprises:
  in response to determining that a data loss rate of the first application is higher than a loss rate threshold, updating the second sensor data via replacing the first data segment of the second sensor data with the second data segment of the prediction sensor data;
  in response to determining that the data loss rate of the first application is not higher than the loss rate threshold, maintaining the second sensor data.

7. The method according to claim 1, wherein the first data segment is a data segment determined to be lost.

8. The method according to claim 1, wherein before the step of managing the second sensor data associated with the plurality of second screen frames by using the first mask, the method further comprises:
  determining whether a signal quality of the second sensor data satisfies a predetermined condition;
  in response to determining that the signal quality of the second sensor data does not satisfy the predetermined condition, managing the second sensor data associated with the plurality of second screen frames by using the first mask;
  in response to determining that the signal quality of the second sensor data does not satisfy the predetermined condition, maintaining the second sensor data associated with the plurality of second screen frames and interacting with the first application with the maintained second sensor data.

9. A host, comprising:
  a non-transitory storage circuit, storing a program code; and
  a processor, coupled to the non-transitory storage circuit and accessing the program code to perform:
    obtaining a plurality of first screen frames of a first application and obtaining a first sensor data associated with the plurality of first screen frames from a first sensor, wherein the first sensor data associated with the plurality of first screen frames are detected during the plurality of first screen frames are displayed;
    determining a first foreground part within each of the plurality of first screen frames;
    determining a first mask associated with the first sensor based on the first foreground part within each of the plurality of first screen frames and the first sensor data associated with the plurality of first screen frames;
    obtaining a plurality of second screen frames of the first application and obtaining a second sensor data associated with the plurality of second screen frames from the first sensor;
    managing the second sensor data via performing at least one of a first procedure and a second procedure, wherein the first procedure comprises managing the second sensor data associated with the plurality of second screen frames by using the first mask, and the second procedure comprises:
      obtaining a plurality of first user images associated with the first sensor data, wherein the plurality of first user images are captured during the first sensor data is detected;
      determining a training data by labelling the plurality of first user images with the associated first sensor data;
      training a prediction model with the training data;
      obtaining a plurality of second user images associated with the second sensor data;
      determining a prediction sensor data based on the plurality of second user images by using the prediction model;

updating the second sensor data via replacing a first data segment of the second sensor data with a second data segment of the prediction sensor data, wherein the second data segment corresponds to the first data segment; and interacting with the first application with the managed second sensor data.

10. The host according to claim 9, wherein the first mask is characterized by a first numerical range, and the processor performs:

in response to determining that the second sensor data comprises outlier data not within the first numerical range, filtering out the outlier data from the second sensor data.

11. The host according to claim 9, wherein before managing the second sensor data associated with the plurality of second screen frames by using the first mask, the processor further performs:

determining whether a first application scene corresponding to the plurality of first screen frames corresponds a second application scene corresponding to the plurality of second screen frames; and in response to determining that the first application scene corresponds to the second application scene, managing the second sensor data associated with the plurality of second screen frames by using the first mask.

12. The host according to claim 11, wherein the processor further performs:

in response to determining that the first application scene does not correspond to the second application scene, managing the second sensor data associated with the plurality of second screen frames by using a second mask corresponding to the second application scene.

13. The host according to claim 9, wherein the processor performs:

characterizing the first sensor data by using a statistical model;

determining a first numerical range based on the statistical model and a default moving range of the first foreground part within each of the plurality of first screen frames; and determining the first numerical range as the first mask.

14. The host according to claim 9, wherein before updating the second sensor data, the processor further performs:

in response to determining that a data loss rate of the first application is higher than a loss rate threshold, updating the second sensor data via replacing the first data segment of the second sensor data with the second data segment of the prediction sensor data;

in response to determining that the data loss rate of the first application is not higher than the loss rate threshold, maintaining the second sensor data.

15. The host according to claim 9, wherein before managing the second sensor data associated with the plurality of second screen frames by using the first mask, the processor further performs:

determining whether a signal quality of the second sensor data satisfies a predetermined condition;

in response to determining that the signal quality of the second sensor data does not satisfy the predetermined condition, managing the second sensor data associated with the plurality of second screen frames by using the first mask;

in response to determining that the signal quality of the second sensor data does not satisfy the predetermined condition, maintaining the second sensor data associated with the plurality of second screen frames and interacting with the first application with the maintained second sensor data.

16. A non-transitory computer readable storage medium, the computer readable storage medium recording an executable computer program, the executable computer program being loaded by a host to perform steps of:

obtaining a plurality of first screen frames of a first application and obtaining a first sensor data associated with the plurality of first screen frames from a first sensor, wherein the first sensor data associated with the plurality of first screen frames are detected during the plurality of first screen frames are displayed;

determining a first foreground part within each of the plurality of first screen frames;

determining a first mask associated with the first sensor based on the first foreground part within each of the plurality of first screen frames and the first sensor data associated with the plurality of first screen frames;

obtaining a plurality of second screen frames of the first application and obtaining a second sensor data associated with the plurality of second screen frames from the first sensor;

managing the second sensor data via performing at least one of a first procedure and a second procedure, wherein the first procedure comprises managing the second sensor data associated with the plurality of second screen frames by using the first mask, and the second procedure comprises:

obtaining a plurality of first user images associated with the first sensor data, wherein the plurality of first user images are captured during the first sensor data is detected;

determining a training data by labelling the plurality of first user images with the associated first sensor data;

training a prediction model with the training data;

obtaining a plurality of second user images associated with the second sensor data;

determining a prediction sensor data based on the plurality of second user images by using the prediction model;

updating the second sensor data via replacing a first data segment of the second sensor data with a second data segment of the prediction sensor data, wherein the second data segment corresponds to the first data segment; and interacting with the first application with the managed second sensor data.

* * * * *